June 8, 1971  F. B. GARZA  3,583,024

DEER PELVIS BONE SHEARING KNIFE

Filed May 22, 1969

INVENTOR.
FRANK B. GARZA

BY Schellin
Hoffman

United States Patent Office 3,583,024
Patented June 8, 1971

3,583,024
DEER PELVIS BONE SHEARING KNIFE
Frank B. Garza, 203 Yuma St.,
San Antonio, Tex. 78211
Filed May 22, 1969, Ser. No. 826,960
Int. Cl. A22b 5/20, 3/10
U.S. Cl. 17—1                                    4 Claims

ABSTRACT OF THE DISCLOSURE

This specification discloses a knife that is intended for use by deer hunters at the site of the kill for the purpose of severing the pelvis bone as an incident to dressing a carcass immediately after the slaying thereof. The knife comprises a handle, a hilt, and a blade extending from the hilt and formed with laterally extending divergent jaws having confronting cutting edges and presenting a gap or recess that receives the pelvis bone. After such reception the blade is imparted a rocking or arcuate movement that results in the bone being sheared.

---

The present invention relates to a hunting knife that is intended for use by deer hunters immediately after the slaying of game to dress the carcass and is concerned primarily with a knife that is peculiarly adapted to shearing the pelvis bone of such a carcass.

BACKGROUND OF INVENTION

At the present time it is universally recognized by deer hunters, game wardens, and the consumers of game that a deer should be dressed immediately after it is slain if the resulting venison is to be maintained in an edible condition. This means that the dressing must take place at the site of the kill.

This dressing involves several operations on the part of the hunter and it has been the practice to employ a conventional hunting knife to perform them. However, an essential element in this dresing is the severing of the pelvis bone. This is ordinarily carried out at the seam, that is, where the bones grow together. Even when this seam is accurately located the hunter experiences considerable difficulty in shearing it. As a practical matter it is usually necessary to supplement manual force by using an impact tool. A conventional tool such as a hammer is not normally available so the hunter resorts to a rock or a similar piece of material which may be handy to strike the knife blade and complete the shearing of the pelvis bone.

At the present time there is not available to the hunting public a knife which will sever the pelvis bone of a deer under manual power alone and this insufficiency has resulted in the makeshift practice above outlined.

OBJECTS OF THE INVENTION

The invention has, as its primary objective, the provision of a hunting knife which is operable to shear the pelvis bone of a deer by manipulation and under the manual power of a single hunter.

A further object is to provide a hunting knife of the type noted which includes a gap or recess defined by cutting edges which receives the pelvis bone.

Another object is to provide a knife of the character aforesaid which is designed to operate with a rocking or arcuate motion whereby mechanical advantage is obtained between the cutting edges and the point of application of power.

SUMMARY OF THE INVENTION

The foregoing objects are achieved by providing a hunting knife that includes a handle, hilt and blade. The handle and hilt are conventional but the blade, is formed at its free end, with a pair of laterally extending jaws substantially normal to the main body of the blade.

These jaws having cutting edges in slightly diverging relation and which edges define a gap or recess which is dimensioned to receive the pelvis bone of a deer.

In use the jaws are forced over the pelvis bone whereupon the blade is imparted a rocking or arcuate motion by the proper application of power to the handle. This results in the bone being sheared.

Various other more detailed objects and advantages of the invention such as a rise in connection with carrying out the above noted ideas in a practical embodiment will in part become apparent and in part be hereinafter stated as the description of the invention proceeds.

For a full and more complete understanding of the invention reference may be had to the following description and accompanying drawing wherein.

Figures 1, 2, 3, 4:
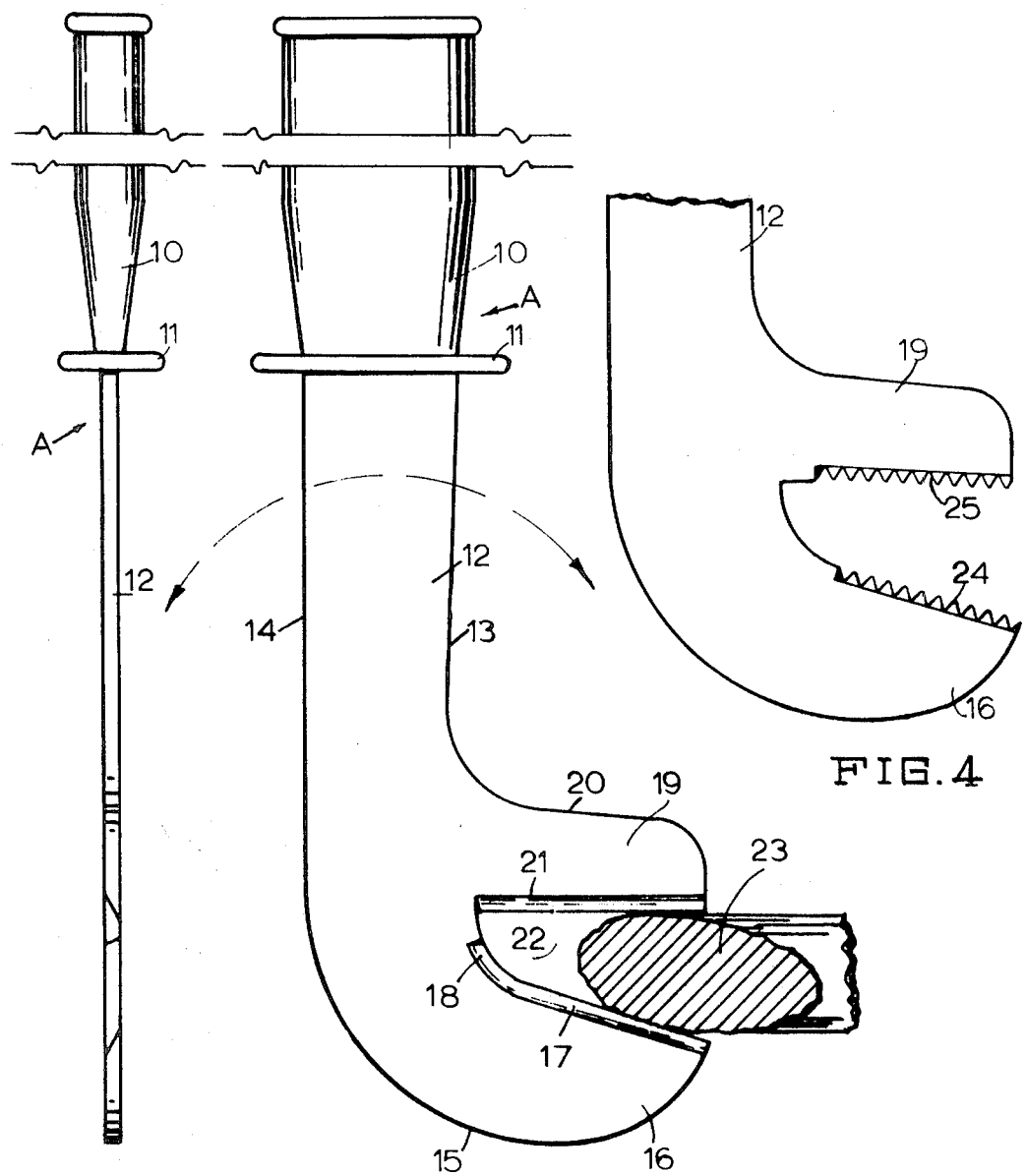
FIG. 1 is a view of a deer carcass that is partially dressed and in position for the severing of the pelvis bone by the knife of this invention.
FIG. 2 is an elevation of the hunting knife with the handle broken away to permit illustration on a scale corresponding to the actual size of the knife.
FIG. 3 is an elevation of the knife of FIG. 2 taken on a plane normal thereto and with the handle broken away.
FIG. 4 is a detail in elevation of a modified form of the cutting edges.

Referring now to the drawings, wherein like reference characters denote corresponding parts, and first more particularly to FIGS. 2 and 3 a hunting knife of this invention is identified in its entirety by the reference character A. It comprises a conventional handle 10, the usual hilt or guard 11, and a blade 12. These elements may be of the materials now commonly employed in the manufacture of hunting knives although a good grade of steel is indicated as being preferable for the blade 12.

The blade 12 presents side edges 13 and 14 which outline the main body portion of the blade. The edge 14 terminates in a curved edge 15 at the free end of the blade and this curved portion is continued laterally over and beyond the edge 13 to provide a jaw 16. The latter has a cutting edge 17 that is at an obtuse angle with respect to edges 13 and 14 if they were extended. The inner portion of edge 17 is curved at 18. The body portion of blade 12 is extended laterally at the end of edge 13 to provide a second jaw 19 defined by edge 20 that blends in with edge 13 and a cutting edge 21 that is substantially normal to edges 13 and 14 when extended.

The cutting edges 17 and 21 are in confronting diverging relation and define a flared gap or recess 22 the wider end of which is disposed at the ends of jaws 16 and 19. These cutting edges are bevelled on one side only.

The manner of using knife A is believed to be obvious from the foregoing description and the illustrations of the drawing. However it may be briefly described by noting that the knife is manipulated to position gap 22 over and about the pelvis bone of a deer as indicated at 23. The flared shape facilitates this maneuver. The knife A and bone 23 are moved towards one another until the cutting edges 17 and 19 engage the bone as depicted in FIG. 2.

The hunter now exerts power or pressure on handle 10 to impart a rocking motion to jaws 16 and 19 as indicated by the arcuate arrows of FIG. 2. This rocking motion is continued as the hunter urges the knife against the bone. This results in the bone being sheared. The rounded end edge 15 facilitates insertion of the jaws into the carcass to encompass the bone 23.

THE MODIFICATION

Referring now to FIG. 4 a modified form which the cutting edges may take is therein illustrated. In the form of FIGS. 2 and 3 the edges 17 and 21 are knife edges. In FIG. 4 they are replaced by saw tooth edges 24 and 25. The mode of operation is the same as for the knife of FIGS. 2 and 3 except for the difference in the sawing action provided by toothed edges 24 and 25.

While preferred specific embodiments of the invention are hereinbefore set forth, it is to be clearly understood that the invention is not to be limited to the exact constructions and designs illustrated and described because various modifications of these details may be provided in putting the invention into practice.

What is claimed is:

1. In a hunting knife intended to shear the pelvis bone of a deer,
   (a) a handle having a free end and a hilt at its other end,
   (b) a blade extending from said hilt substantially in alignment with said handle and having spaced straight side edges, one of which is longer than the other,
   (c) the longer of said side edges being continued in a lateral direction to define an end edge which partially defines a jaw remote from said handle, the definition of said jaw being completed by a cutting edge having an outer straight portion at an obtuse angle with respect to said longer side edge when projected, and
   (d) a second jaw integral with said blade and spaced from the first said jaw, said second jaw having a straight cutting edge substantially normal to the shorter of said side edges when projected,
   the cutting edges of said jaws defining an outwardly flared gap adapted to receive the pelvis bone of a deer.

2. The hunting knife of claim 1 in which the cutting edges are bevelled on only one side.

3. The hunting knife of claim 1 in which the cutting edges are saw teeth.

4. The hunting knife of claim 1 in which the jaw defined by the end edge and the cutting edge at the obtuse angle, has a curved inner cutting edge that is a continuation of the outer straight portion of the cutting edge.

References Cited

UNITED STATES PATENTS 3,365,798    1/1968    Cunningham _____ 30—287

FOREIGN PATENTS 555,435    8/1943    Great Britain _____ 17—1

OTHER REFERENCES

German printed application No. 1,225,073, September 1966, Lauterjung et al.

LUCIE H. LAUNDENSLAGER, Primary Examiner

U.S. Cl. X.R.

30—287, 299